April 13, 1954
R. E. REINHARDT
2,674,804
COMPUTING DEVICE
Filed Feb. 5, 1953
4 Sheets-Sheet 1
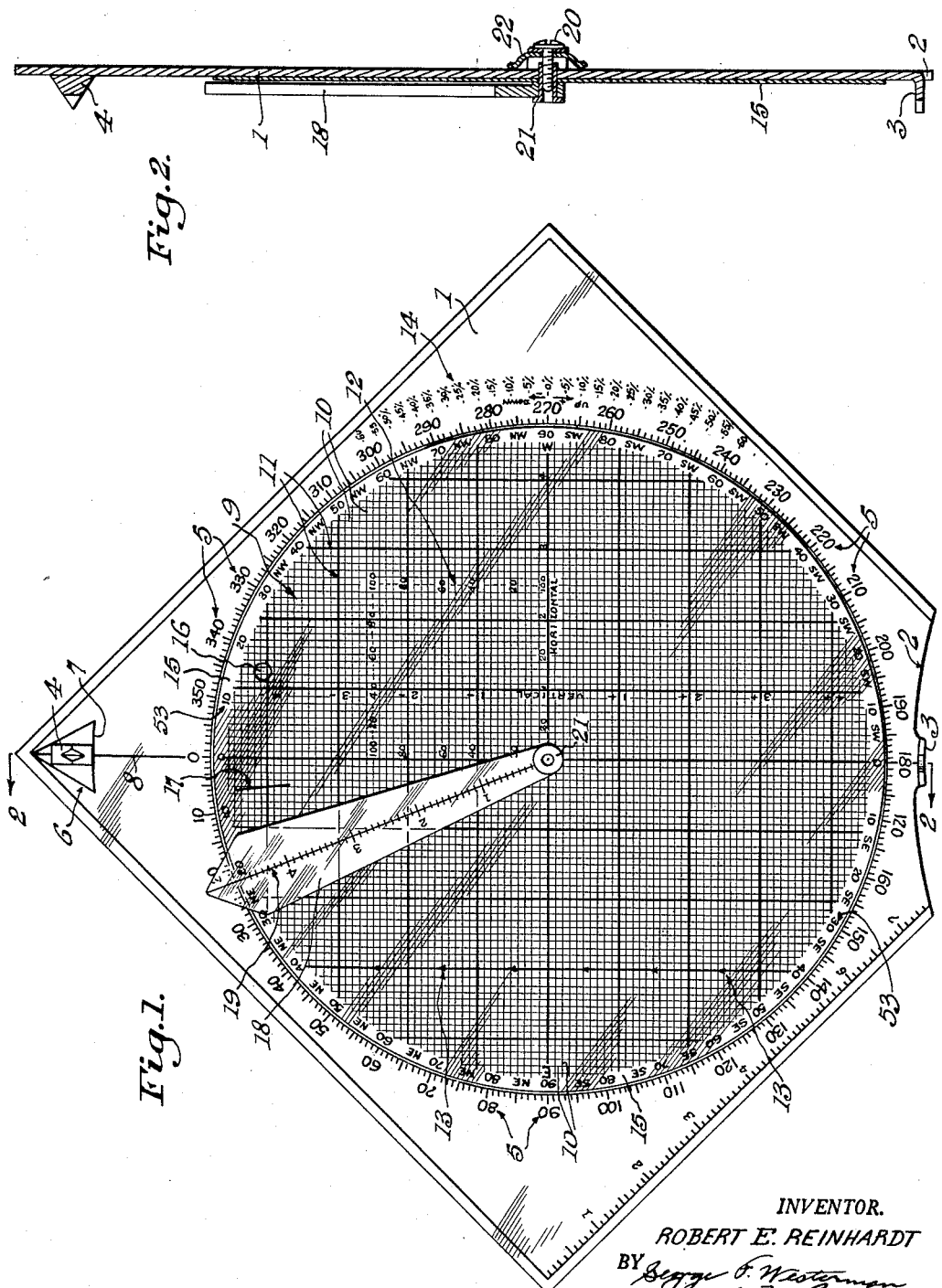
INVENTOR.
ROBERT E. REINHARDT
BY April 13, 1954    R. E. REINHARDT    2,674,804
COMPUTING DEVICE
Filed Feb. 5, 1953    4 Sheets-Sheet 2

INVENTOR.
ROBERT E. REINHARDT
BY
ATTORNEYS

April 13, 1954  R. E. REINHARDT  2,674,804
COMPUTING DEVICE
Filed Feb. 5, 1953  4 Sheets-Sheet 3
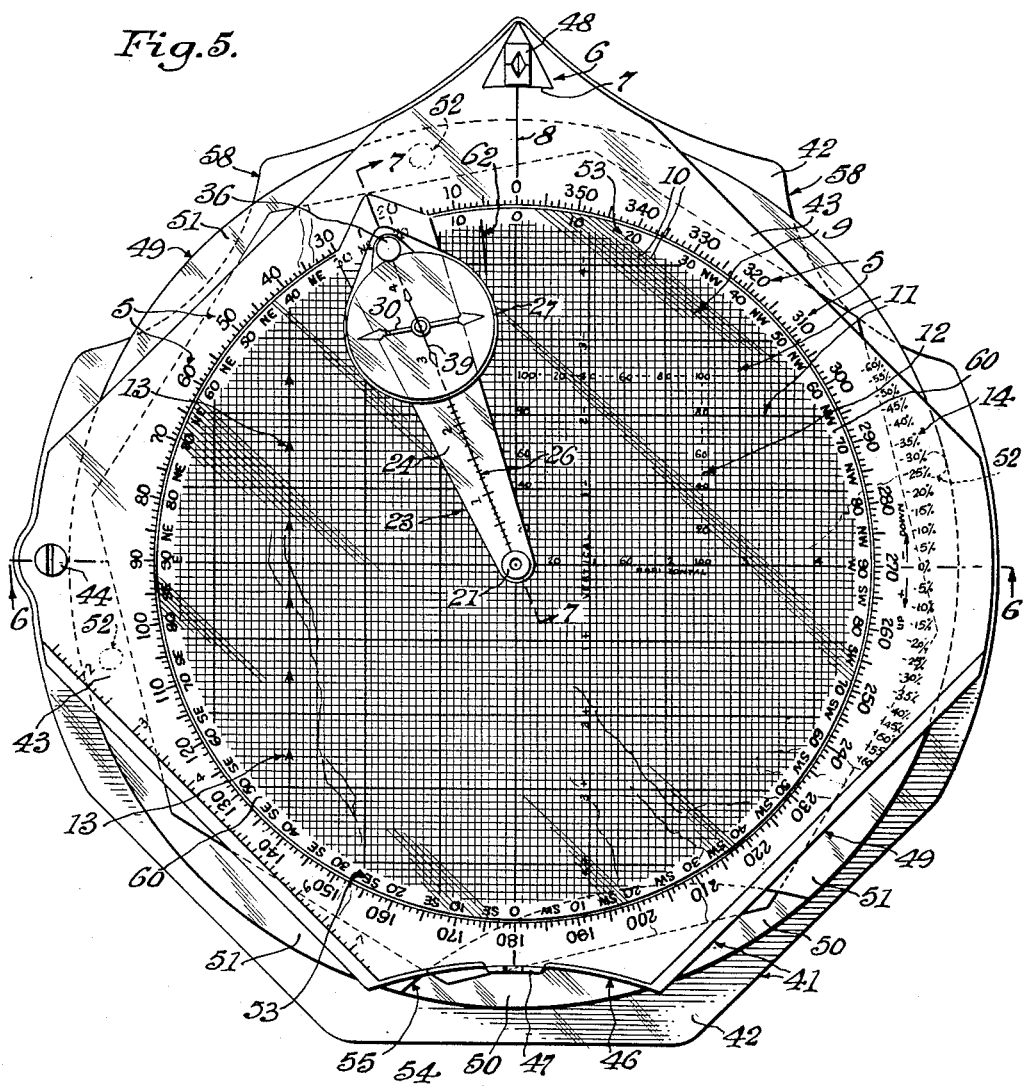
Fig.5.
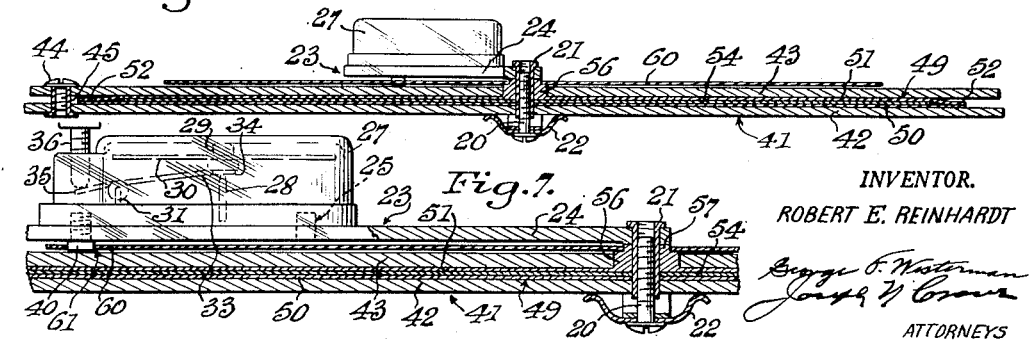
Fig.6.
Fig.7.
INVENTOR.
ROBERT E. REINHARDT
ATTORNEYS April 13, 1954     R. E. REINHARDT     2,674,804
COMPUTING DEVICE Filed Feb. 5, 1953     4 Sheets-Sheet 4

INVENTOR.
ROBERT E. REINHARDT
BY
ATTORNEYS

Patented Apr. 13, 1954

2,674,804

UNITED STATES PATENT OFFICE 2,674,804

COMPUTING DEVICE

Robert E. Reinhardt, San Francisco, Calif.

Application February 5, 1953, Serial No. 335,407

11 Claims. (Cl. 33—67)

(Granted under Title 35, U. S. Code (1952), sec. 266)

The invention described herein may be manufactured and used by or for the Government for governmental purposes, without payment to me of any royalty thereon.

My invention relates to a plotting and computing device and particularly to such a device for rapid surveying and map preparation.

An object of my invention is to provide a simple instrument for plotting courses and mapping land which eliminates the use of a number of separate tools and instruments for this purpose.

Another object of my invention is to provide a device which will compute elevations for the preparation of topographic maps in addition to the plotting of horizontal courses and maps.

Another object of my invention is to provide a topographical mapping instrument which eliminates the need for familiarity by the user with measurements of angles by degrees or mils.

Another object of my invention is to provide a topographical mapping device by which airplane photographs may be directly translated into directions and distances on the ground in a simple and accurate manner.

Another object of my invention is to provide a device which will enable soldiers on night combat patrol to plot their course with a minimum use of lights.

A further object of my invention is to provide a topographical plotting instrument which may be used for roughly solving mathematical equations encountered in surveying.

A still further object of my invention is to provide a light, compact, portable and thoroughly water-resistant plotting device for foresters, timber cruisers, surveyors and engineers.

With the above and other objects in view, my invention consists of certain novel features of construction and operation of parts which will hereinafter be described and shown in the accompanying drawings in which:

Fig. 1 is a top plan view of the device embodying the preferred form of the invention;

Fig. 2 is a sectional view taken on the line 2—2 of Fig. 1;

Fig. 3 is an enlarged fragmentary plan view of the device embodying a modified form of the invention;

Fig. 6 is a sectional view taken on line 6—6 of Fig. 5;

Fig. 7 is a detailed sectional view taken on line 7—7 of Fig. 5, parts being shown in elevation;

Figure 4:
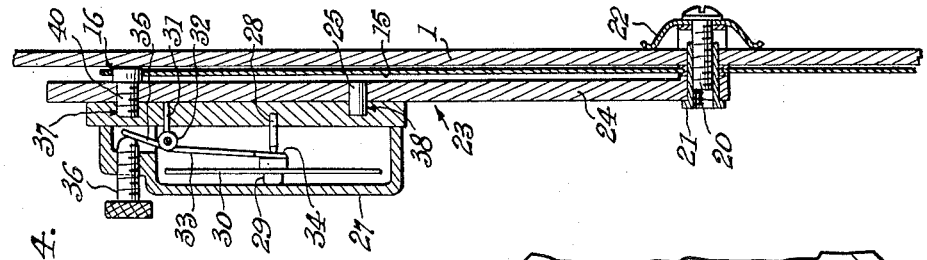
Fig. 4 is a sectional view taken on the line 4—4 of Fig. 3.

Referring more in detail to the drawings and particularly to Figs. 1 and 2 thereof, the preferred embodiment of my invention consists of a flat, substantially square base 1 having one corner thereof cut away to form an arcuate edge 2. The base 1 may be fashioned of any suitable material, for example, plastic or plywood. The base member has a centrally disposed aperture provided therein.

A rear peep-sight 3 is shown as an integral upturned flange centrally mounted on the arcuate edge 2 of the base 1 and having a sighting slit therein. A front peep-sight 4 is suitably mounted on the upper surface of the base 1 adjacent the oppositely disposed corner and provided with a sighting slit. The front peep-sight 4 is preferably composed of a fluorescent material for convenient use under night conditions.

The base 1 has a reverse or counter-clockwise compass rose 5 and an inner scale 53 graduated in degrees corresponding to compass points arranged by quadrants in transposed order with relation to the line passing through the 0°–180° marks of the compass rose 5 delineated thereon concentric with the centrally disposed aperture therein. An arrow delineated on the base 1 includes an arrowhead 7 surrounding the front peep-sight at the base thereof and pointing in the direction of the base corner and a diametric line 8 extending from the front peep-sight 4 through the 0°–180° or north-south points of the reverse compass rose 5 to the rear peep-sight 3. A cross-line grid 9 is delineated on the upper surface of the base 1 within the circumference of the reverse compass rose. The grid is graduated in squares of one-tenth of an inch indicated at 10 and having one inch squares emphasized by heavier lines as at 11.

One of the vertical lines and one of the horizontal lines of the grid 9 are referenced by numerals for convenient reading. A 100 unit grid 12 is preferably provided in the upper right quadrant of the grid 9. This unit grid comprises a 2½ inch square having its lower left corner at the pivot point of a central aperture provided on the base 1. Each one-tenth inch graduation within the 2½ inch square constitutes 4 units of the 100 unit grid 12. Reference numerals are delineated on the perimeter of the 100 unit grid 12 for ready reference. Arrowheads 13 may be also delineated on one of the vertical lines of the grid 9 pointing toward the north direction of the compass rose 5.

A curved percentage scale 14 is delineated on the base 1 in juxtaposition to the reversed compass rose 5. The percentage scale 14 is calibrated from 0% to 100% on either side of the 0% index point which is preferably in juxtaposition to the 270° calibration of the reverse compass rose.

A light-transmitting or transparent plotting disc 15 having an aperture centrally disposed therein is rotatably mounted on the upper surface of the base 1. The disc 15 has a somewhat roughened surface to facilitate legible plotting and drawing upon its surface and lends itself to erasures thereon by an eraser or by wiping with a damp cloth. The circumference of the overlying disc 15 is preferably less than that of the compass rose 5 to permit the graduations on the latter to be easily read. An aperture 16 is also provided in the disc near the periphery thereof. The aperture 16 represents the magnetic north point on the disc. A temporary line 17 is delineated on the disc 15 along a radius thereof and preferably extends to the circumference of the disc. The line 17 represents the true north point on the disc. The magnetic declination at a particular place is first computed and this declination is then shown on the disc 15 by the position of the line 17 either to the right or the left of the aperture 16.

A transparent indicator 18 having an aperture near the tapered end thereof is rotatably mounted on the upper surface of the disc 15. A center line 19 extending from the pointed end to the tapered end of the indicator 18 is preferably etched on the lower surface thereof adjacent the transparent disc 15. The center line 19 is graduated into one-tenth of an inch and one inch calibrations by short lines or marks arranged perpendicular to the center line. The one inch graduations are preferably numbered for convenient reference. The center line, cross markings and associated numerals may be colored to facilitate reading the indicator.

The base 1, the transparent disc 15, and the indicator 18 are secured together. The transparent disc 15 is superimposed over the base 1 and the indicator 18 is mounted on the disc 15 by means of a headed stud 20 passing through the bottom of the central apertures of the base and the transparent disc and the aperture of the indicator and secured by a threaded sleeve 21 from the top. Prior to the insertion of the threaded stud 20, a brass tension washer 22 is mounted thereon. The tension washer 22 is supported against the lower surface of the base 1 thereby retaining the indicator 18 in releasable tension on the upper surface of the transparent disc 15.

Figure 9:
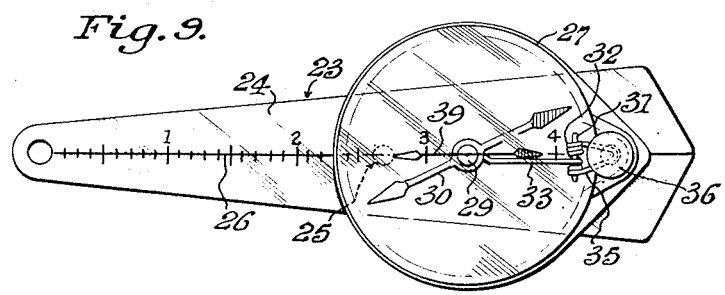
Fig. 9 is a top plan view of the modified form of the indicator arm shown in Figs. 3 and 5.

Referring now to Figs. 3, 4 and 9, there is illustrated a modification of the preferred form of my invention shown in Figs. 1 and 2 hereof wherein similar numerals are applied to similar parts. A modified light-transmitting or transparent indicator shown generally at 23 is substituted for the transparent indicator 18 shown in Figs. 1 and 2 hereof.

The indicator 23 is shown as comprising a transparent lever arm 24 having a pointed end and tapering therefrom to the oppositely disposed end. The lever arm 24 is provided with an aperture at the tapered end and a second aperture adjacent the pointed end thereof. An integral stud 25 is provided on the upper surface of the lever arm 24 at a point approximately one quarter of the distance from the pointed end thereof. A center line 26 bisecting the angle formed by the pointed end extends from the pointed end to the tapered end of the lever arm 24. The center line 26 is preferably etched on the lower surface of the lever arm 24 and graduated into one-tenth of an inch and one inch calibrations by short lines or marks arranged perpendicular to the center line. The one inch graduations are numbered for convenient reference. The center line, cross markings and associated numerals may be colored to facilitate reading the lever arm 24.

A transparent plastic compass housing 27 has centrally disposed therein a vertically extending steel pivot pin 28 at the top of which there is disposed a jewel mounting 29 for supporting a magnetized steel needle 30. An inverted U-shaped member 31 is vertically mounted within the housing 27 near the periphery thereof. A coil-spring 32 is mounted on the inverted U-shaped member 31 and carries an arm 33 having a loop 34 at the end thereof for encircling the pivot pin 28. A V-shaped member 35 carried by the coil-spring 32 extends towards the periphery of the compass housing 27.

A threaded aperture is provided in the upper surface of the compass housing 27 for the insertion of a threaded stud 36. The threaded stud 36 is tightened to depress the V-shaped member 35 thereby lifting the compass needle 30 off the jewel mounting 29 by means of the loop 34 on the arm 33 attached to the coil-spring 32. The stud 36 is loosened to elevate the V-shaped member 35 thereby depressing the arm 33 and allowing the compass needle 30 to pivot freely. A threaded recess 37 is provided in the lower surface of the housing 27 in vertical alignment with the threaded stud 36. A second recess 38 is provided in the lower surface of the housing 27 in vertical alignment with the stud 25 on the lever arm 24.

Compass needle indicia 39 are delineated on the upper surface of the housing 27. A distinctive coloring is provided for each of the end points of the indicia. A color, for example, red, indicates the north point of the indicia. The color green could indicate the south point of the indicia. The north point of the indicia faces in the direction of the stud 36 on the compass housing 27.

The compass housing 27 is rotatably mounted on the upper surface of the lever arm 24 adjacent the pointed end thereof by the insertion of a threaded stud 40 from the lower surface of the lever arm 24 through the aperture therein into the threaded recess 37 on the lower surface of the compass housing. The stud 25 provided on the upper surface of the lever arm 24 is inserted into the recess 38 on the lower surface of the compass housing. The housing 27 may be swung laterally from the upper surface of the lever arm 24 by lifting up the housing 27 an amount sufficient to raise the recess 38 clear of the stud 25 and rotating the housing about the stud 40 which latter is arranged to provide sufficient play to permit such movement to facilitate reading the calibrations on the lever arm.

The indicator 23 is rotatably mounted on the upper surface of the disc 15. The stud 40 on the lower surface of the lever arm 24 thereof is adapted to engage the magnetic north aperture 16 on the plotting disc 15.

The base 1, the transparent disc 15, and the indicator 23 are secured together. The transparent disc 15 is superimposed over the base 1 and the indicator 23 is mounted on the disc 15 by means of a headed stud 20 passing through the bottom of the central aperture of the base and the transparent disc and the aperture of the indicator and secured by a threaded sleeve 21 from the top. Prior to the insertion of the threaded stud, a brass tension washer 22 is mounted thereon. The tension washer 22 is supported against the lower surface of the base 1 thereby retaining the indicator 23 in releasable tension on the upper surface of the transparent disc 15.

Referring now to Figs. 5, 6, 7 and 8, there is illustrated a further modification of my invention wherein similar numerals are applied to similar parts. There is provided a transparent base indicated generally at 41. The base 41 comprises a flat, irregularly octagonal-shaped transparent plate 42 having a central aperture therein. A second flat, irregularly octagonal-shaped transparent plate 43 having an enlarged central aperture therein is removably mounted on the transparent plate 42. The upper plate 43 is secured to the lower plate 42 by the insertion of a threaded stud 44 through the concentric apertures located near the periphery of the respective plates. A threaded sleeve 45 mates with the threaded stud 44 from the bottom. The perimeter of the upper plate 43 is preferably less than that of the lower plate 42.

The upper transparent plate 43 of the base 41 has one octagonal surface thereof cut away to form an arcuate edge 46. A rear sight 47 is shown as an integral upturned flange centrally mounted on the arcuate edge 46 having a sighting slit therein. A front peep-sight 48 is suitably mounted on the upper surface of the plate 43 adjacent the oppositely disposed pointed edge and provided with a sighting slit. The front peep sight 48 is preferably composed of a fluorescent material for use under night conditions.

The indicia delineated on the upper transparent plate 43 are identical with the indicia printed on the base 1. Accordingly, a detailed description thereof is not again repeated.

Figure 8:
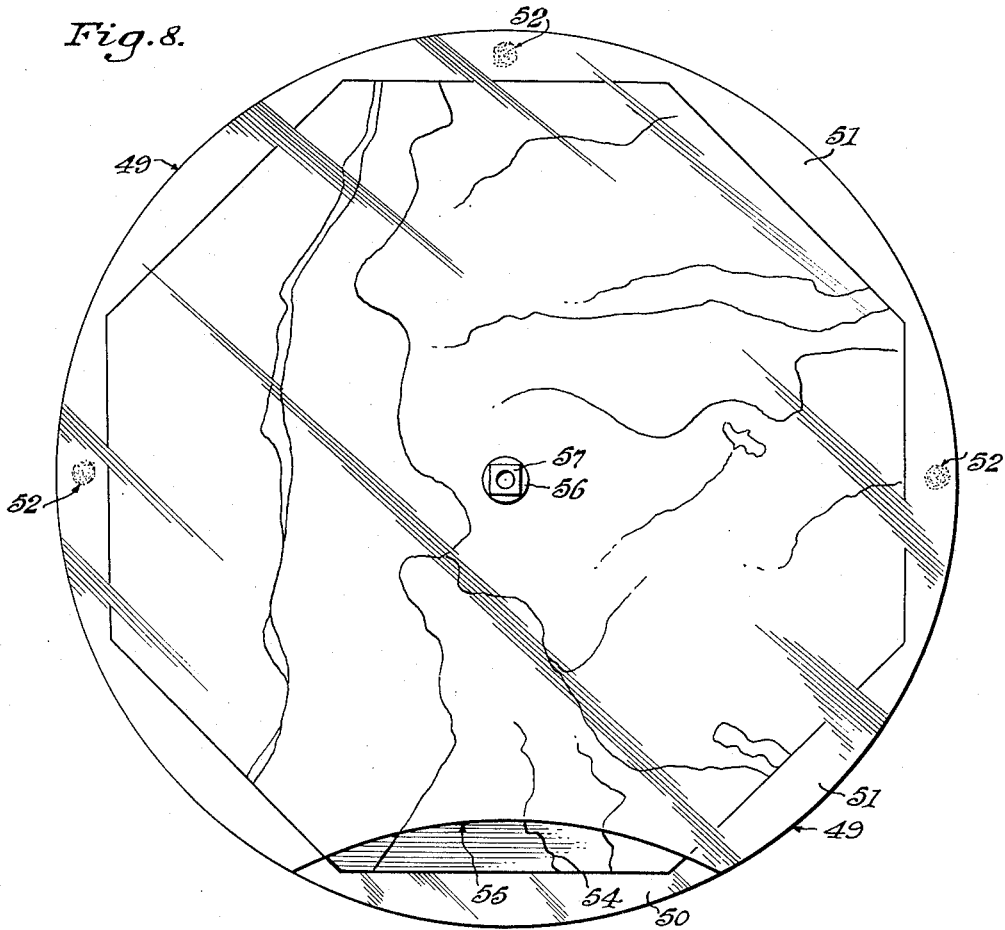
Fig. 8 is a top plan view of the envelope disc shown in Fig. 5.

As best shown in Fig. 8, a transparent envelope indicated generally at 49 comprises a transparent disc 50 having a central aperture therein and a second concentric transparent disc 51 having a central aperture therein fixedly mounted thereon. The upper disc 51 is firmly attached to the lower disc 50 at points 52 in any suitable manner, for example, by fusing the discs or gluing them together. A map 54 is shown as inserted between the discs 50 and 51. The upper disc 51 is recessed at 55 to provide a convenient method for the user of the device to readily grip the map 54 when inserting or removing it. A circular stud 56 having a square stud 57 mounted thereon is permanently secured on the upper surface of the disc 51 concentric with the central aperture of the disc. The envelope 49 is rotatably mounted between the transparent plates 42 and 43 and may be easily gripped for rotation by the user because of the recesses 58 provided in the transparent plate 42.

A light-transmitting or transparent plotting disc 60 having a square aperture centrally disposed therein is rotatably mounted on the upper surface of the transparent plate 43 of the base 41. The disc 60 has a somewhat roughed surface to facilitate legible plotting and drawing upon its surface and lends itself to erasures thereon by an eraser or by wiping with a damp cloth. The circumference of the overlying disc 60 is preferably less than that of the compass rose 5 to permit the graduations on the latter to be easily read. An aperture 61 is also provided in the disc near the periphery. The aperture 61 represents the magnetic north point on the disc. A temporary line 62 is delineated on the disc 60 along a radius thereof and preferably extends to the circumference of the disc. The line 62 represents the true north point on the disc. The magnetic declination at a particular place is first computed and this declination is shown on the disc 60 by the position of the line 62 either to the right or the left of the aperture 61.

Figure 5:
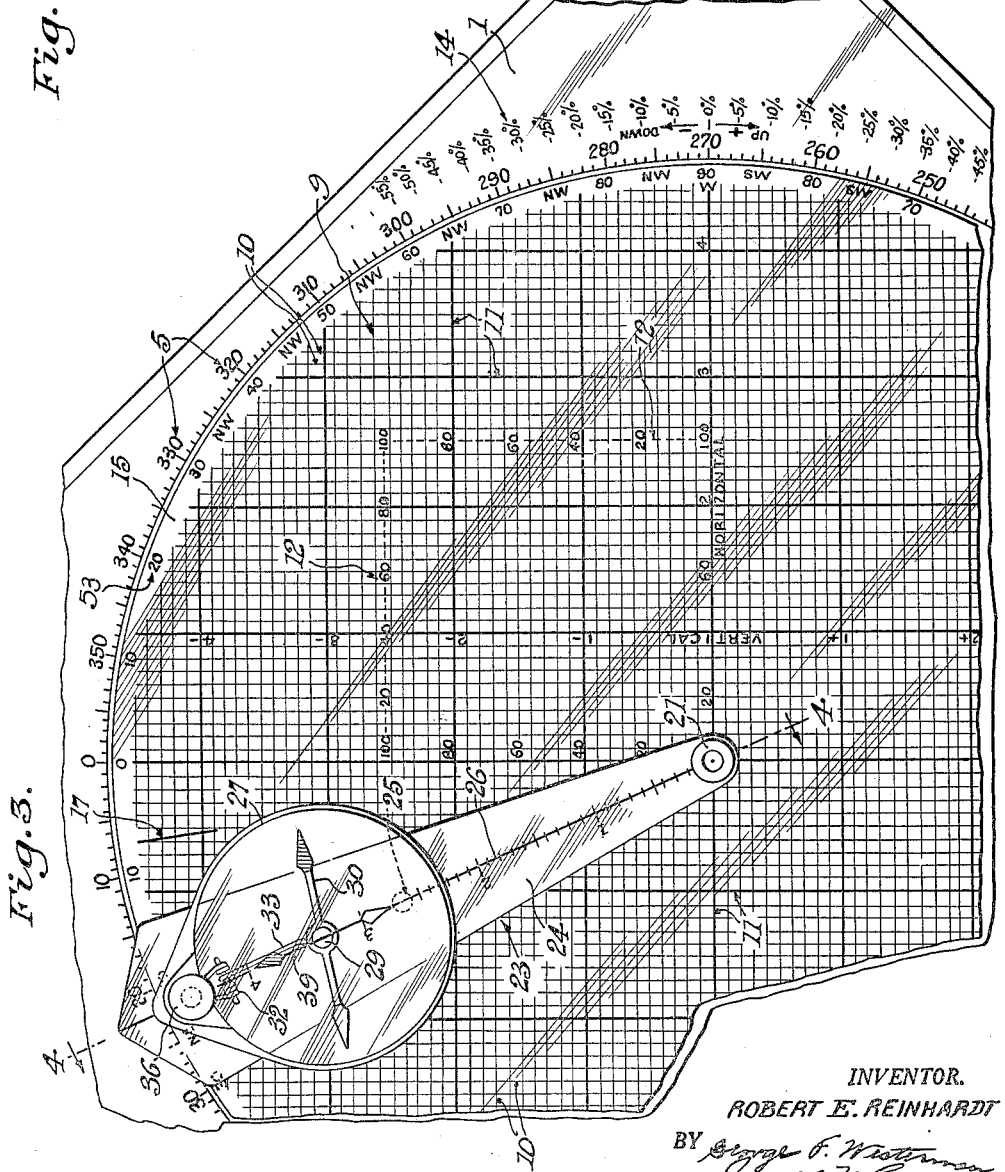
Fig. 5 is a top plan view of the device embodying a further modified form of the invention.

The modified form of indicator 23 best shown in Figs. 3, 5 and 9 is rotatably mounted on the upper surface of the plotting disc 60. Since the indicator 23 has been described hereinabove, a detailed description thereof is not repeated.

The transparent base member 41, the transparent plotting disc 60, and the transparent indicator 23 are secured together. The transparent plates 42 and 43 are separated sufficiently to insert the transparent envelope 49 therebetween. The plate 43 will then snugly fit the circular stud 56 mounted on the surface of the disc 51. The plotting disc 60 is rotatably mounted on the upper surface of transparent plate 43 of the base 41 and snugly fits the square stud 57 mounted on the circular stud 56. The plotting disc 60 is thereby simultaneously rotated by the rotation of the envelope 49. The indicator 23 is rotatably mounted on the upper surface of the plotting disc 60. A headed stud 20 carrying a brass tension washer 22 thereon is passed through the bottom of the central apertures of the base 41 and the plotting disc 60 and the aperture at the tapered end of the indicator 23 and secured by a threaded sleeve 21 from the top.

The preferred form of my device shown in Fig. 1 and the modifications illustrated in Figs. 3 and 5 may be used to map flat land; locate an object by triangulation; sketch as from a plane table; secure elevations, slope distance, horizontal distance and percentage of slope; and solve division, multiplication and proportion problems. The modified devices illustrated in Figs. 3 and 5 further permit mapping without reference to degrees, and translating maps and vertical aerial photographs directly into directions and distances on the ground.

In the operation of the plotting and computing device shown in Figs. 1 and 2, the arcuate edge 2 of the base 1 is meant to rest against the lower chest of the viewer and the lower surface of the base 1 is supported on the left forearm if the person is right-handed. The upturned palm holds the corner of the base having the front sight 4 and the arrowhead 7 of the arrow 6 mounted thereon. The arrow 6 is permanently oriented on the 0° or north point of the reverse compass rose 5. This corner of the base is pointed away from the viewer and in the direction that he is sighting. The temporary disc line 17, or the magnetic north aperture 16 may be used as the magnetic north point on the disc 15.

If it is assumed that a surveyor wishes to map a small field with sides apparently laid out according to cardinal directions and he stands at the southeast corner of the field and faces north, the plotting disc 15 is turned until the disc line 17 points to zero. A small mark such as an "x" is placed with a soft pencil near the middle of the lower right-hand quadrant of the disc 15 at some line intersection. This is his location. The point may be labeled "A." In the field, the compass reading along the fence would read 0°, or north, which is the present disc line reading. A straight line is drawn from point "A" parallel to the arrow 6 and away from the surveyor for about 4½ inches. This is the directional line.

Imagine that the measured distance to the next fence corner is 400 feet. A scale of 100 feet equals one inch is assumed, and a small dash is placed across the line four inches above "A." The lines of the grid 9 perpendicular to the arrow 6 measure the distance. The lines of the grid 9 parallel to the arrow 6 help keep your directional line parallel. Label the second point "B" and erase the line left above it. For erasures, an art gum eraser is preferred.

The next assumed compass reading is west, or 270°. The disc 15 is turned until the disc line 17 rests on 270°. A "directional" line from "B" is drawn parallel to the arrow 6 and away from viewer for about 4½ inches. Imagine that the surveyor then measured that side as 430 feet. He lays off 4.3 inches on the line from point "B" and marks the point there "C." Two sides of the field have now been mapped.

Assume that the above field is not rectangular, as the surveyor had supposed, but irregular, and the next compass reading was 199°, or S. 19° W. The disc line is placed on that reading and the direction line and distance is laid off as on the previous readings. Assuming a distance of 520 feet, lay off 5.2 inches on the line and mark the new location point "D." Three sides of the field have now been mapped and the rest of the field could be similarly completed no matter how many sides it had.

Now imagine that the surveyor might want to postpone further survey, and return to point "A" most directly. The disc is turned to place points "A" and "D" in parallel alignment with the arrow 6, the place "A" nearest the arrowhead 7. Read the disc line for the direction which is about 81½° and measure the distance which is about 606 feet.

In mapping flat land generally, a compass reading is taken roughly along one side of your job. The disc 15 is turned until the disc line 17 coincides with that reading. If the area to be mapped is ahead on the right, start in the lower left part of the disc. Briefly, the steps in running a traverse are as follows:

a. Take a compass sight on your traverse.

b. Turn the disc so that the disc line 17 points to the reading.

c. Decide on the scale of your map.

d. From a point chosen as your location draw a straight line on the disc away from you, and parallel to the arrow 6 the approximate distance to the next point.

e. Measure the distance to the next point.

f. Locate the point just reached by marking off the measured distance on the line previously drawn on the disc.

g. Take a new sight and repeat the procedure.

An object may be located by triangulation by sighting to the object from any point on your traverse and taking a compass bearing. The disc is turned until the disc line points to that reading and a line drawn from your point parallel to and in the direction of the arrow. When the object is again sighted on the traverse, another bearing is taken, the disc oriented and the second line drawn. The object is located where the two lines cross.

The plotting and computing device may be used to sketch as from a plane table. Whenever the arrow 7 is pointed to coincide with the indicated position of the north pole of the compass needle, which is in the unlocked position, and the plotting disc 15 or 60, as the case may be, is separately rotated to bring the disc line 17 or 62, respectively, into coincidence with this indicated position, the plotting disc 15 or 60, as the case may be, is oriented with the surrounding country. Nearby objects can then be quickly sketched in as on a plane table in their true topographical location. This is the only time that a line is drawn in a direction other than parallel to the arrow and in the direction in which it points.

The above-described operations may similarly be performed by the modified forms of the invention best illustrated in Figs. 3 and 5 hereof. The following operations which may also be performed by all three forms of the device disclosed are described with relation to the device shown in Figs. 1 and 2 hereof.

The plotting and computing device has a calibrated, pivoted indicator 18 by which slope, distance, elevations, horizontal distance, percent ratios and other information may be calculated to a degree of accuracy often acceptable for quick field work. The indicator 18 is plumbed by holding the device on edge with the west point or 270° calibration of the reverse rose compass directed toward the ground and the brass tension washer 22 which holds a constant tension on the pivot is flattened by pushing the pivot. It is important that the indicator swing freely while plumbing. When the pressure is released, the pivot tightens the indicator in the plumbed position. The device is held on edge as described above and the indicator plumbed while sighting to an object through the sights.

If it is desired to secure the elevation of point "H" and the elevation at point "G" is known and that the distance to point "H" is 180 feet, a sight is taken on point "H" with the device and let the indicator plumb. We now assume that the indicator plumbs at azimuth 252 and that a scale of 100 feet equals one inch is selected. The 1.8 inch graduation on the horizontal line of the grid 9 will represent the 180 feet horizontal distance between points "G" and "H."

It will be noted that the 1.8 inch line on the horizontal scale will intersect the center line of the plumbed arm 0.6 inch below the horizontal scale. This segment of line 0.6 inch in length represents the elevation difference of points "G" and "H," which would read as plus 60 feet above your eye level. If the horizontal distance scale point exceeds the perimeter of the grid 9, then the figure is divided by a digit so that the scale point may be placed on grid. After the elevation difference distance is computed, it is multiplied by the divisional digit.

If it is desired to measure the slope distance knowing a hill has a 37° slope and that it is necessary to go 250 feet horizontally to set a stake, the indicator is held where it has plumbed at an assumed 37° or azimuth 233. The 2.5 inch mark is noted on the horizontal line and followed down to the center line on the indicator. The slope distance of 3.13 inches or about 313 feet appears on the graduated center line of the indicator.

The curved percentage scale 14 delineated on the base 1 in juxtaposition to the reverse compass rose 5 enables one to read the percentage of slope directly when the indicator is plumbed. The percent of slope may also be read on each of the vertical inch scale lines by dividing the number crossed by the center line of the indicator by the inch unit measurement. The percent of slope will also appear on the vertical boundary of the 100 unit scale nearest the periphery of grid.

Division and multiplication may also be accomplished by use of the 100 unit scale on the face of the grid. If it is desired to solve, for example, the division problem of 60 is what percent of 80, lay off 80 units on the line marked horizontal and then go vertically 60 units and note the intersection. The plumb arm is swung across the intersection and the correct answer of 75% may be read from the vertical 100 unit line or directly from the percent scale. Multiplication is accomplished by the reverse of this procedure.

In solving proportions, the first number is assigned to the vertical scale and the second number to the horizontal scale. The unknown or "x" will be read on the vertical scale where the line from the fourth number of the proportion runs up from the horizontal line and intersects the center line of the indicator.

In mapping without reference to degrees, the modified forms of my device as best shown in Figs. 3 and 5 are used.

The plotting device is first sighted along the chosen bearing thus pointing the device in that direction. The stud mounted on the upper surface of the compass housing is loosened thereby releasing the compass needle. The indicator is then engaged in the magnetic north aperture on the plotting disc. The plotting disc of the device shown in Fig. 3 or the envelope shown in Fig. 5 is rotated until the north or red colored end of the compass needle rests in alignment with the corresponding red colored end of the compass needle indicia delineated on the upper surface of the compass housing. The compass needle is then lifted by tightening the stud again. A line is drawn on the plotting disc from the present location parallel to the arrow and away from you. Further reference to the indicator is not necessary until a change in course is made.

When translating maps and vertical aerial photographs directly into directions and distances on the ground, the modified device shown in Fig. 3 may have a portion of a map traced on the plotting disc or inserted between the base and the plotting disc. The map is properly oriented with respect to the magnetic north aperture or the true north disc line. The present location and the location of the objective are placed in parallel alignment to the arrow with the objective nearest the head of the arrow. The distance to the objective is scaled. The indicator is then engaged in the magnetic north aperture and the needle released. The viewer holding the device turns his body until the red and green ends of the compass needle are aligned with the respective end of the compass needle indicia on the compass housing and proceeds in the direction of the arrow for the scaled distance.

The modified form of my device as best shown in Fig. 5 hereof translates maps and vertical aerial photographs into directions and distances on the ground similar to the above-described procedure except for the location of the oriented map. The portion of map to be translated into direction and distance is readily inserted and properly oriented in the map envelope with respect to the true north disc line or magnetic north aperture of the plotting disc. The remaining steps of the translation are identical with those steps set forth for the modified device disclosed in Fig. 3 hereof.

An additional feature of the modification shown in Fig. 5 is the transparency of the entire structure whereby a minimum source of light (not shown) may be used below the device to illuminate it so that it may be used advantageously by soldiers on night combat patrol.

Thus, it will be seen that there has herein been provided a novel and efficient form of plotting and computing device which is well adapted for the purposes indicated. Even though there has been shown and described the invention as comprising certain features of construction and operation of parts, it is nevertheless understood that various changes may be made therein without departing from the spirit or scope of the claims.

Having thus described my invention, what I claim as new and wish to secure by Letters Patent is:

1. A plotting and computing device comprising a base having a centrally disposed aperture therein, a reverse compass rose delineated on the base concentric with the centrally disposed aperture, a crossline grid delineated centrally on the base within the circumference of the reverse compass rose, a light transmitting disc having a writing surface and disposed on the base, the transparent disc being provided with a central aperture and a second aperture near the periphery thereof, pivot means rotatably securing the light-transmitting plotting disc to the base, and an indicator rotatably mounted on the pivot means.

2. A plotting and computing device comprising a base having a centrally disposed aperture therein, a reverse compass rose delineated on the base concentric with the centrally disposed aperture, a crossline grid delineated centrally on the base within the circumference of the reverse compass rose, a light-transmitting disc having a writing surface and disposed on the base, the transparent disc being provided with a central aperture and a second aperture near the periphery thereof, pivot means rotatably securing the light-transmitting plotting disc to the base, and an indicator having a calibrated radial line rotatably mounted on the pivot means.

3. A plotting and computing device comprising a base having a centrally disposed aperture therein, a reverse compass rose delineated on the base concentric with the centrally disposed aperture, a crossline grid delineated centrally on the base within the circumference of the reverse compass rose, a light-transmitting plotting disc capable of being marked with a pencil and disposed over the base, the light-transmitting disc being provided with a central aperture and a second aperture near the periphery thereof, and a transparent indicator mounted on the light-transmitting plotting disc, the transparent indicator having nearly radially extending sides and a calibrated radial line thereon equidistant from the sides.

4. A plotting and computing device comprising a base having a centrally disposed aperture therein, a reverse compass rose delineated on the base concentric with the centrally disposed aperture, a crossline grid delineated centrally on the base within the circumference of the reverse compass rose, a light-transmitting plotting disc capable of being marked with a pencil and disposed on the base, the light-transmitting plotting disc having a central aperture and a second aperture near the periphery thereof, pivot means rotatably securing the light-transmitting plotting disc to the base, a transparent indicator rotatably mounted on the pivot means, the transparent indicator having nearly radially extending sides and a calibrated radial line thereon equidistant from the sides, the transparent indicator extending to a point beyond the reverse compass rose, the extended portion laterally converging to the radial line on the transparent indicator, and a curved scale measuring amounts of slope and elevation delineated on the base in juxtaposition to the reverse compass rose coincident with the point of intersection of the converging extended sides and the radial line on the transparent indicator.

5. A plotting and computing device comprising a base having a centrally disposed aperture therein, a reverse compass rose delineated on the base concentric with the centrally disposed aperture, a crossline grid delineated centrally on the base within the circumference of the reverse compass rose, a transparent disc having a writing surface rotatably mounted on the base, the transparent disc bearing a radially extending line representing the true north, an aperture adjacent to the circumference of the disc representing the magnetic north, the aperture being offset from the line at an angular declination approximating the declination of the magnetic north from the true north, a transparent radially graduated indicator pivotally mounted on the base overriding the rotatable disc, said indicator having nearly radially extending sides extending longitudinally of the indicator from the pivotal mounting thereof to the reverse compass rose, the said indicator being rotatable relative to the base and independently of the disc.

6. A plotting and computing device comprising a base provided with a centrally disposed aperture, a reverse compass rose delineated on the base concentric with the centrally disposed aperture, a diametric line delineated on the base and extending through 0°–180° graduations of the reverse compass rose, a crossline grid delineated centrally on the base within the circumference of the reverse compass rose, a square grid delineated on the base, the square grid having one corner thereof disposed at the center point of the crossline grid and one side thereof in parallel alignment with the diametric line, a transparent plotting disc capable of being marked with a pencil and disposed on the base, the transparent disc being provided with a central aperture and a second aperture near the periphery thereof, pivot means rotatably securing the transparent plotting disc to the base, and an indicator mounted on the pivot means extending to the graduations of the reverse compass rose.

7. A plotting and computing device comprising a base provided with a centrally disposed aperture, a reverse compass rose delineated on the base concentric with the centrally disposed aperture, sighting means being diametrically oppositely disposed and aligned with the 0°–180° graduations on the reverse compass rose, a diametric line delineated on the base and extending through 0°–180° graduations of the reverse compass rose, a crossline grid delineated centrally on the base within the circumference of the reverse compass rose, a square grid delineated on the base, the square grid having one corner thereof disposed at the center point of the crossline grid and one side thereof in parallel alignment with said diametric line, a transparent plotting disc capable of being marked with a pencil and disposed on the base, the transparent disc being provided with a central aperture and a second aperture near the periphery thereof, pivot means rotatably securing the transparent plotting disc to the base, and an indicator mounted on the pivot means extending to the graduations of the reverse compass rose.

8. A plotting and computing device comprising a base having a centrally disposed aperture therein, a reverse compass rose delineated on the base concentric with the centrally disposed aperture, a crossline grid delineated centrally on the base within the circumference of the reverse compass rose, a light-transmitting plotting disc capable of being marked with a pencil and disposed over the base, the light-transmitting disc being provided with a central aperture and a second aperture near the periphery thereof, and a transparent indicator mounted on the light-transmitting plotting disc, the transparent indicator including a transparent lever arm having nearly radially extending sides and a calibrated radial line thereon equidistant from the sides, a compass housing mounted on the lever arm, a compass needle supported within the compass housing, and means interconnecting the compass housing to the lever arm, one of said means being received in the second aperture in the disc representing the magnetic north.

9. A plotting and computing device comprising a flat, substantially square base provided with a centrally disposed aperture and having one corner thereof provided with a recess, a rear peep-sight mounted on the base at the recessed corner thereof, a front peep-sight mounted on the base at a point opposite the rear sight; a reverse compass rose delineated on the base concentric with the centrally disposed aperture; an index arrow delineated on the base, the index arrow having its point adjacent the front peep-sight and extending through 0°–180° graduations of the reverse compass rose; a curved scale delineated on the base in juxtaposition to the reverse compass rose, a crossline grid delineated centrally on the base within the circumference of the reverse compass rose, a transparent plotting disc having a writing surface and disposed over the base, the transparent disc being provided with a central aperture therein and a second aperture near the periphery thereof, pivot means rotatably securing the transparent disc to the base; a transparent indicator rotatably mounted on the pivot means, the transparent indicator comprising a transparent lever arm having an aperture at one end thereof, a calibrated radial line delineated on the lower surface of the lever arm, a compass housing mounted on the upper surface of the lever adjacent the oppositely disposed end thereof, a stud mounting the compass housing on the lever arm, the stud being adapted to engage the aperture provided near the periphery of the transparent disc, compass means disposed within the compass housing, and locking means operatively connected to the compass means; and releasable tension means normally securing the transparent indicator relative to the transparent disc.

10. A plotting and computing device comprising a transparent base having a centrally disposed aperture therein, the transparent base comprising a transparent plate, a transparent disc disposed on the transparent plate, a second concentric transparent disc fixedly mounted on the first transparent disc, a second transparent plate disposed over the second transparent disc, means fixedly securing the second transparent plate to the first transparent plate, a reverse compass rose delineated on the second transparent plate concentric with the center point thereof; a curved scale delineated on the second transparent plate in juxtaposition to the reverse compass rose; a crossline grid delineated centrally on the second transparent plate within the circumference of the reverse compass rose; sights diametrically oppositely disposed on the second transparent plate and aligned with the 0°–180° graduations of the reverse compass rose, a transparent plotting disc having a writing surface and disposed on the base, means securing the transparent plotting disc to the second transparent disc; pivot means rotatably securing the transparent plotting disc to the base, an indicator rotatably mounted on the pivot means, and releasable tension means normally retaining the indicator relative to the transparent plotting disc.

11. A plotting and computing device comprising a transparent base having a centrally disposed aperture therein, the transparent base comprising a transparent plate, a second transparent plate mounted on the first transparent plate, means fixedly securing the second plate to the first plate, a transparent envelope disposed between the first and second plates; a reverse compass rose having graduations from 0° to 360° thereon delineated on the second plate concentric with the center point thereof; a curved scale delineated on the second plate in juxtaposition to the reverse compass rose; a crossline grid delineated centrally on the second plate within the circumference of the reverse compass rose; sights diametrically oppositely disposed on the second plate and aligned with the 0°–180° graduations of the reverse compass rose; a transparent plotting disc having a writing surface disposed on the base, the transparent plotting disc being provided with a central aperture therein and a second aperture near the periphery thereof; means securing the transparent plotting disc to the envelope, pivot means rotatably securing the transparent plotting disc on the base, a transparent indicator rotatably mounted on the pivot means; the transparent indicator comprising a radial line delineated on the lower surface of the lever arm, a compass housing mounted on the upper surface of the lever arm adjacent the oppositely disposed end thereof, pivot means rotatably mounting the compass housing on the lever arm, compass means disposed within the compass housing, and locking means operatively connected to the compass means; and releasable tension means normally retaining the transparent indicator relative to the upper surface of the transparent plotting disc.

References Cited in the file of this patent

UNITED STATES PATENTS

| Number | Name | Date |
|---|---|---|
| 886,695 | Grenier | May 5, 1908 |
| 2,114,652 | Dalton | Apr. 19, 1938 |
| 2,407,893 | Meyer | Sept. 17, 1946 |
| 2,618,856 | Sweet | Nov. 25, 1952 |

FOREIGN PATENTS

| Number | Country | Date |
|---|---|---|
| 504,651 | Great Britain | Apr. 28, 1939 |
| 52,688 | France | June 12, 1944 |
| (1st. Addition to No. 859,739) | | |